United States Patent
Yang et al.

(10) Patent No.: US 9,843,172 B2
(45) Date of Patent: Dec. 12, 2017

(54) SWITCHBOARD WITH POSITION-INDICATING APPARATUS

(71) Applicant: LSIS CO., LTD., Anyang-si, Gyeonggi-do (KR)

(72) Inventors: Seungpil Yang, Anyang-si (KR); Jongdoo Kim, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 107 days.

(21) Appl. No.: 14/979,318

(22) Filed: Dec. 22, 2015

(65) Prior Publication Data
US 2016/0190778 A1 Jun. 30, 2016

(30) Foreign Application Priority Data

Dec. 31, 2014 (KR) .................. 10-2014-0196023
Feb. 23, 2015 (KR) .................. 10-2015-0025346

(51) Int. Cl.
*H02B 11/12* (2006.01)
*H02B 11/10* (2006.01)
*H02B 11/167* (2006.01)
*H02B 11/127* (2006.01)

(52) U.S. Cl.
CPC .......... *H02B 11/10* (2013.01); *H02B 11/167* (2013.01); *H02B 11/127* (2013.01)

(58) Field of Classification Search
None
See application file for complete search history.

(56) References Cited

U.S. PATENT DOCUMENTS

| 3,588,398 | A |   | 6/1971 | Siviy |   |
|---|---|---|---|---|---|
| 4,860,161 | A | * | 8/1989 | Maki | H02B 11/133 200/50.17 |
| 4,926,286 | A | * | 5/1990 | Maki | H02B 1/14 200/50.17 |
| 5,097,382 | A | * | 3/1992 | Leach | H02B 11/127 361/615 |
| 5,206,468 | A | * | 4/1993 | Kobayashi | H02B 11/133 200/50.23 |
| 8,198,557 | B2 | * | 6/2012 | Lee | H02B 11/133 200/50.21 |
| 8,638,561 | B2 | * | 1/2014 | Lehtola | H05K 7/1409 361/724 |
| 8,934,217 | B2 | * | 1/2015 | Christensen | H01H 3/26 200/310 |

(Continued)

FOREIGN PATENT DOCUMENTS

| CN | 201178259 | 1/2009 |
|---|---|---|
| CN | 101404391 | 4/2009 |

(Continued)

OTHER PUBLICATIONS

Korean Intellectual Property Office Application No. 10-2015-0025346, Notice of Allowance dated Feb. 24, 2017, 5 pages.

(Continued)

*Primary Examiner* — Courtney Smith
(74) *Attorney, Agent, or Firm* — Lee, Hong, Degerman, Kang & Waimey

(57) ABSTRACT

The present invention employs a separate rotation-adjusting member, which allows a position of a circuit breaker or a transformer to be recognized from outside without an error.

3 Claims, 8 Drawing Sheets

(56) References Cited

U.S. PATENT DOCUMENTS

| | | | | |
|---|---|---|---|---|
| 2002/0079201 A1* | 6/2002 | Yang | ............... | H02B 11/10 200/50.26 |
| 2002/0100667 A1* | 8/2002 | Leccia | ............. | H02B 11/133 200/50.21 |
| 2009/0255791 A1 | 10/2009 | Narayanan et al. | | |
| 2011/0285483 A1* | 11/2011 | Morris | ............... | H01H 3/26 335/71 |
| 2015/0102608 A1* | 4/2015 | Kim | ................. | H01H 9/22 292/140 |
| 2015/0103472 A1* | 4/2015 | Oneufer | ............. | H01H 71/56 361/605 |

FOREIGN PATENT DOCUMENTS

| | | |
|---|---|---|
| CN | 101770903 | 7/2010 |
| CN | 203312684 | 11/2013 |
| CN | 103996988 | 8/2014 |
| EP | 2110905 | 10/2009 |
| EP | 2228877 | 9/2010 |
| EP | 2595261 | 5/2013 |
| JP | 59-95712 | 6/1984 |
| JP | 3-270610 | 12/1991 |
| JP | H10256739 | 9/1998 |
| KR | 20020042987 | 6/2002 |
| KR | 101099420 | 12/2011 |
| KR | 101106899 | 1/2012 |
| KR | 101168083 | 7/2012 |

OTHER PUBLICATIONS

European Patent Office Application Serial No. 15202297.6, Search Report dated May 20, 2016, 8 pages.

European Patent Office Application Serial No. 15173618.8, Search Report dated May 19, 2016, 7 pages.

State Intellectual Property Office of the People's Republic of China Application Serial No. 201511036158.5, Office Action dated May 17, 2017, 6 pages.

* cited by examiner

SWITCHBOARD WITH POSITION-INDICATING APPARATUS

CROSS-REFERENCE TO RELATED APPLICATION

Pursuant to 35 U.S.C. §119(a), this application claims the benefit of earlier filing date and right of priority to Korean Patent Application No. 10-2014-0196023, filed on Dec. 31, 2014 and Korean Patent Application No. 10-2015-0025346, filed on Feb. 23, 2015, the contents of which are all hereby incorporated by reference herein in its entirety.

BACKGROUND OF THE INVENTION

1. Field of the Invention

This specification relates to a switchboard with a position-indicating apparatus, and more particularly, a switchboard with a position-indicating apparatus, capable of externally indicating a position of a truck, which moves with a circuit breaker or a transformer mounted thereon, without an error.

2. Background of the Invention

In general, a circuit breaker refers to an electric protection device which protects a load device and a wire from a fault current upon an occurrence of a fault, such as short-circuit, earth fault and the like, on an electric circuit.

Such circuit breakers are classified into an oil circuit breaker using oil as an arc-extinguishing medium, a gas circuit breaker using sulfar hexafluoride ($SF_6$) which is an inert gas, an air circuit breaker using air as an arc-extinguishing medium, a circuit breaker using magnetism, a vacuum circuit breaker using dielectric strength of vacuum, and the like.

In recent time, most of electric appliances use sulfar hexafluoride ($SF_6$), which exhibits superior arc-extinguishment and insulating performance, as an insulating medium. However, the sulfar hexafluoride ($SF_6$) causes the greenhouse effect, which is 23,900 times of carbon dioxide, and thus its use is restricted worldwide.

Active developments of eco-friendly electric apparatuses using media which can replace the sulfar hexafluoride ($SF_6$) are undergoing. Demand for a vacuum circuit breaker which is one of such eco-friendly electric apparatuses is rapidly increasing.

The vacuum circuit breaker generally serves to control power transfer and protect a power system, and has an increasing application range from an intermediate voltage to a high voltage, from the perspective of its great breaking capacity, high reliability and stability, and a need of a small installation space.

The vacuum circuit breaker is installed along with a switchboard, in which several electric apparatuses including a circuit breaker are accommodated and managed for an operation or control of a power station, a substation and the like, an operation of a motor, etc., and is used by being accommodated in a cradle fixed to the switchboard.

In the switchboard having such vacuum circuit breaker, a metering transformer chamber is formed at a lower portion of a cradle, and a transformer is installed in the transformer chamber. The transformer as well as the circuit breaker is mounted on a truck. The truck with the transformer and the circuit breaker moves to a test position for maintenance and an operation position (or a driving position) where it is connected to a load terminal to perform transformation.

FIG. 1 is a schematic view of a switchboard according to the related art.

As illustrated in FIG. 1, a switchboard 10 with a vacuum circuit breaker includes a vacuum circuit breaker chamber 11 accommodating a vacuum circuit breaker 12 therein, a transformer chamber 13 located below the vacuum circuit breaker chamber 11 and accommodating a transformer 14 therein. The transformer chamber 13 can be open using a transformer door 17.

The vacuum circuit breaker 12 is provided in the vacuum circuit breaker chamber 11. The transformer 14 which is mounted on a truck 16 moves in the transformer chamber 13 to the test position or the operation position. A power fuse 18 is provided at a top of the transformer 14, and a ground switch 15 is provided at a rear surface of the switchboard 10.

The related art switchboard having such configuration is not provided with a separate apparatus for preventing a position of the vacuum circuit breaker 12 or the transformer 14 from being wrongly (erroneously) indicated to the exterior, upon externally indicating the position of the vacuum circuit breaker 12 or the transformer 14. This makes it difficult to check an accurate position of the vacuum circuit breaker 12 or the transformer 14 from the exterior.

Also, because of non-employment of an apparatus for preventing the position of the vacuum circuit breaker 12 or the transformer 14 from being indicated as a different (or wrong) position to the exterior, an operator misunderstands the operation position as the test position when the vacuum circuit breaker 12 or the transformer 13 is located at the operation position, and accordingly opens a vacuum circuit breaker door or the transformer door 17. This results in frequent occurrence of accidents, such as an electric shock and the like.

SUMMARY OF THE INVENTION

Therefore, to solve the related problems, an aspect of the detailed description is to provide a switchboard having a position (or location)-indicating apparatus, capable of externally indicating a position of a truck, which moves with a circuit breaker or transformer mounted thereon, without an error.

To achieve these and other advantages and in accordance with the purpose of this specification, as embodied and broadly described herein, there is provided a switchboard having a position-indicating apparatus for indicating a position of a transformer or a circuit breaker, wherein the position-indicating apparatus includes a case, a position-indicating unit provided at the case and indicating a test position or an operation position of a truck, on which the circuit breaker or the transformer is mounted, a rotation member provided in the case and connected to the position-indicating unit to be rotatable in response to rotation of the position-indicating unit, and a rotation-adjusting member located between the rotation member and the truck, and rotatable toward the rotation member or the truck, in response to a movement of the truck, to restrict a rotation of the rotation member to the test position or the operation position. Here, the rotation-adjusting member may prevent the rotation member from rotating to the operation position when the truck is located at the test position, and prevent the rotation member from rotating to the test position when the truck is located at the operation position.

Also, the rotation-adjusting member may include an adhesion pin disposed to protrude toward the truck, and a rotation plate coupled with the adhesion pin, and including a first rotation-adjusting plate provided at one side thereof and protruding toward the rotation member, and a second rotation-adjusting plate provided at another side thereof and protruding toward the rotation member. A truck cover may be provided at a front surface of the truck. The truck cover may push the adhesion pin and the first rotation-adjusting plate may accordingly protrude toward the rotation member, such that the rotation of the rotation member toward the operation position is restricted by the first rotation-adjusting plate, in case where the truck moves to the test position. An adhesion between the truck cover and the adhesion pin may be released and simultaneously the rotation plate may rotate so as for the second rotation-adjusting plate to protrude toward the rotation member, such that the rotation of the rotation member toward the test position is restricted by the second rotation-adjusting plate, in case where the truck moves to the operation position.

The rotation member may include a first wing plate, and a second wing plate integrally extending from one side of the first wing plate to form a predetermined angle with the first wing plate. The first rotation-adjusting plate may be brought into contact with the first wing plate to restrict the rotation of the rotation member toward the test position when the rotation member rotates to the operation position, in response to rotation of the position-indicating unit, while the truck is located at the test position. The second rotation-adjusting plate may be brought into contact with the second wing plate to restrict the rotation of the rotation member toward the operation position when the rotation member rotates to the test position, in response to the rotation of the position-indicating unit, while the truck is located at the operation position.

The first rotation-adjusting plate and the second rotation-adjusting plate may be inwardly inclined by predetermined angles.

A switchboard having a position-indicating apparatus according to the present invention may employ a separate rotation-adjusting member. The rotation-adjusting member may move toward a rotation member connected to a position-indicating unit, in response to a movement of a truck with a circuit breaker or a transformer mounted thereon, so as to restrict a rotation of the rotation member. Accordingly, a rotation of the position-indicating unit to an operation position may be prevented when the truck is located at a test position, and a rotation of the position-indicating unit to the test position may be prevented when the truck is located at the operation position. This may allow for recognizing the position of the circuit breaker or the transformer from outside without an error.

Also, since the position of the circuit breaker or the transformer is recognized from outside without an error, an accident, such as an electric shock, which happens to an operator due to opening a door when the circuit breaker or the transformer is located at the operation position.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of preferred configurations of a switchboard having a position-indicating apparatus in accordance with one embodiment of the present invention, with reference to the accompanying drawings.

Figure 1:
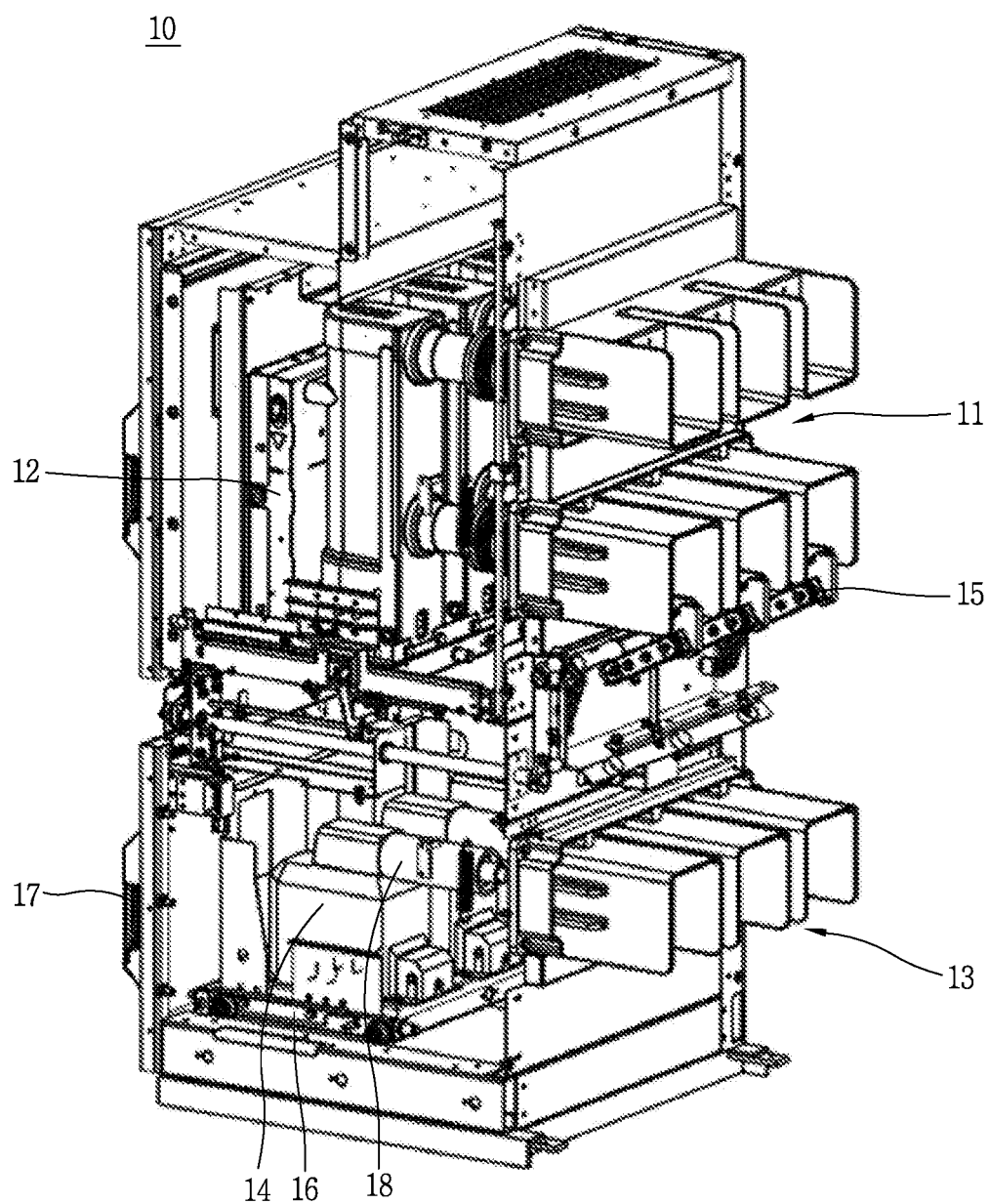
FIG. 1 is a schematic view illustrating an internal configuration of the related art switchboard.
Figure 2:
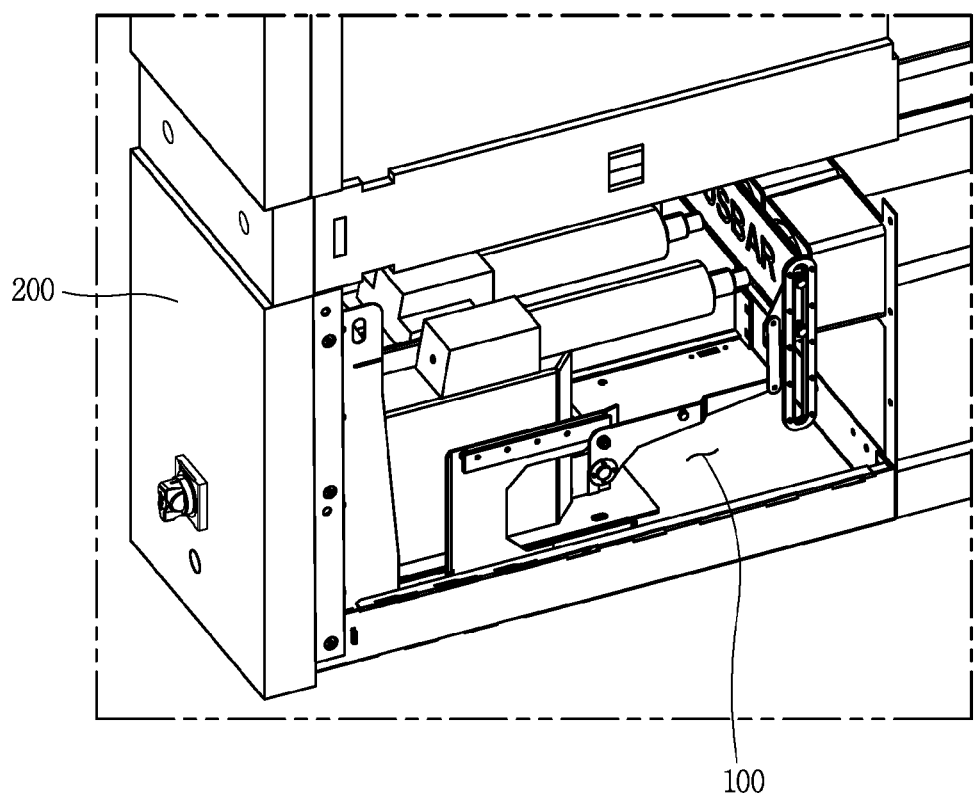
FIG. 2 is a schematic view illustrating an internal configuration of a switchboard in accordance with the present invention.
Figure 3:
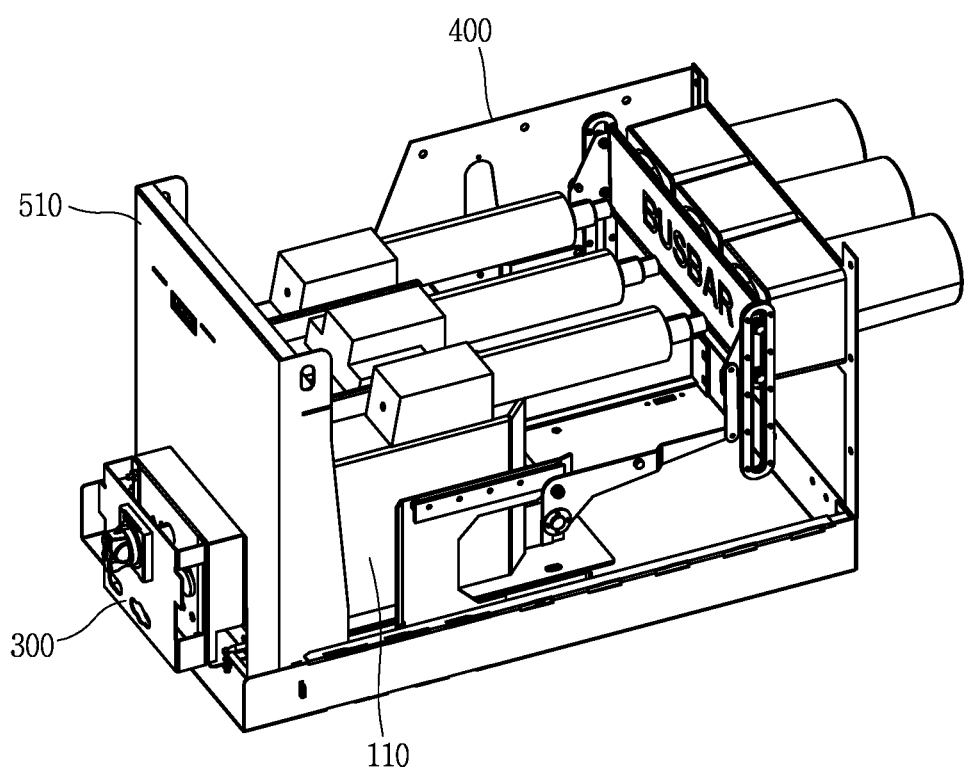
FIG. 3 is a perspective view illustrating a state that a truck is located at a test position within the switchboard in accordance with the present invention.
Figure 4:
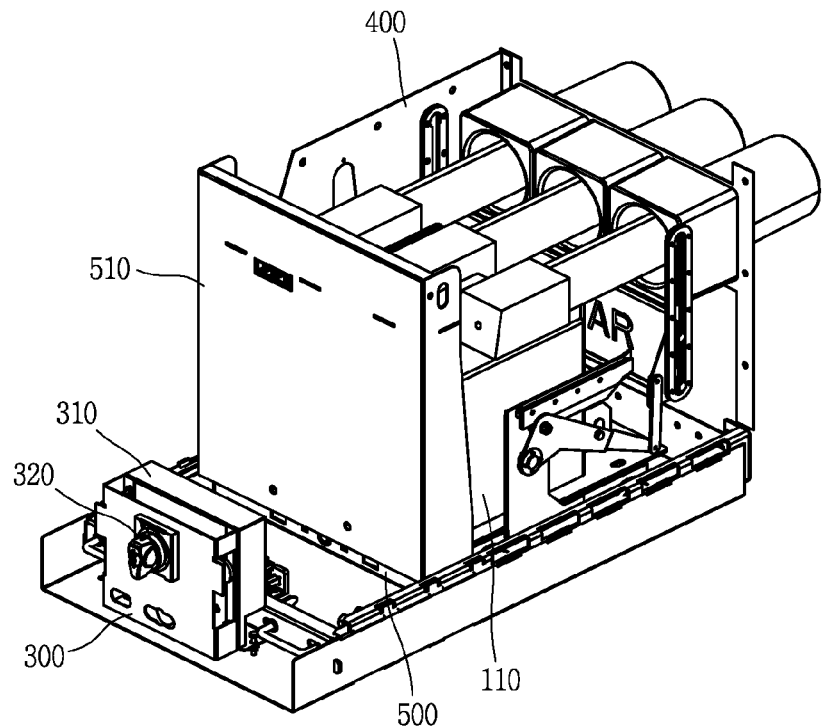
FIG. 4 is a perspective view illustrating a state that the truck is located at an operation position in the switchboard in accordance with the present invention.
Figure 5:
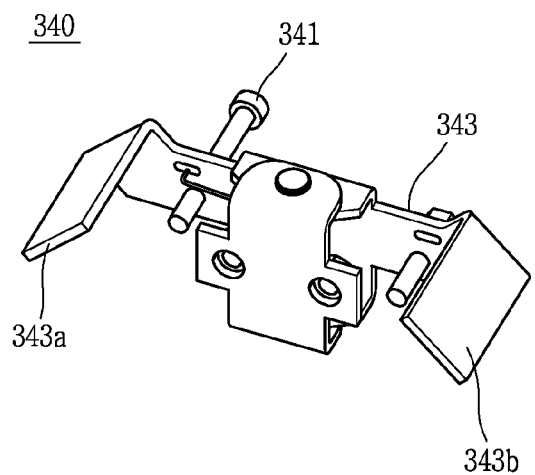
FIG. 5 is a perspective view illustrating a rotation-adjusting member employed in a position-indicating apparatus in accordance with the present invention.

FIG. 2 is a schematic view illustrating an internal configuration of a switchboard in accordance with the present invention, FIG. 3 is a perspective view illustrating a state that a truck is located at a test position within the switchboard in accordance with the present invention, FIG. 4 is a perspective view illustrating a state that the truck is located at an operation position in the switchboard in accordance with the present invention, and FIG. 5 is a perspective view illustrating a rotation-adjusting member employed in a position-indicating apparatus in accordance with the present invention.

Figure 6:
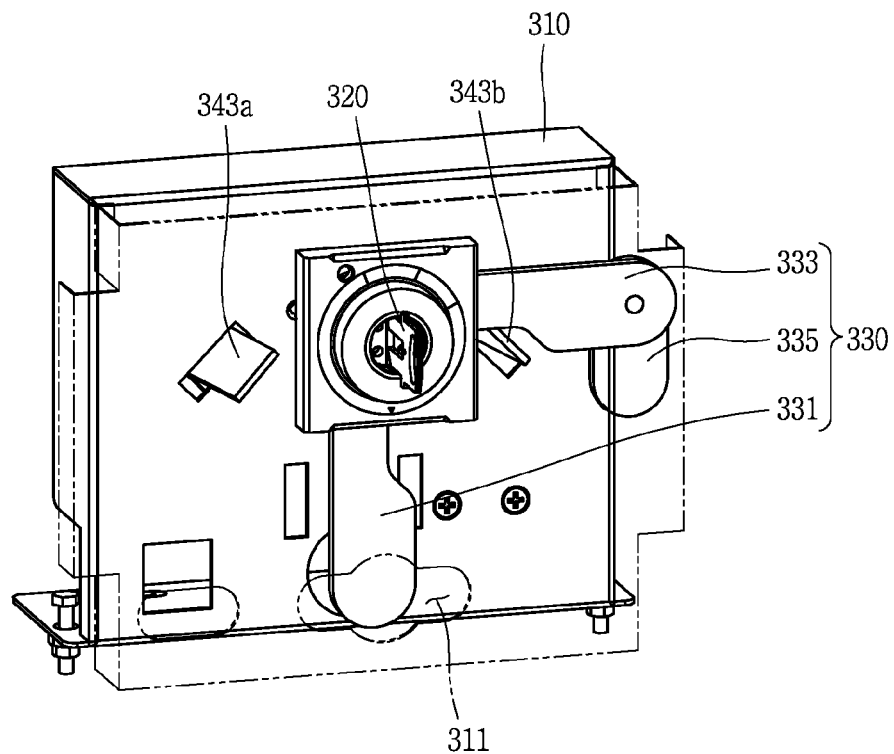
FIG. 6 is a perspective view illustrating the position-indicating apparatus in a state that the truck is located at the test position in accordance with the present invention.
Figure 7:
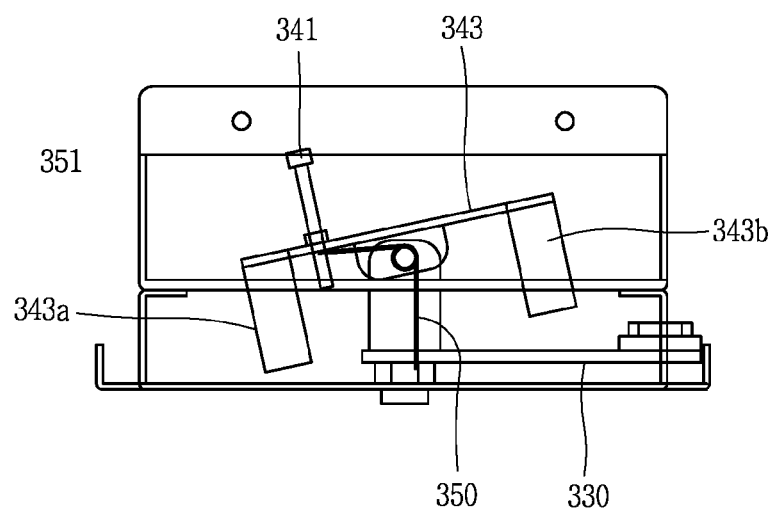
FIG. 7 is a projective view illustrating the position-indicating apparatus in a state that the truck is located at the test position in accordance with the present invention.
Figure 8:
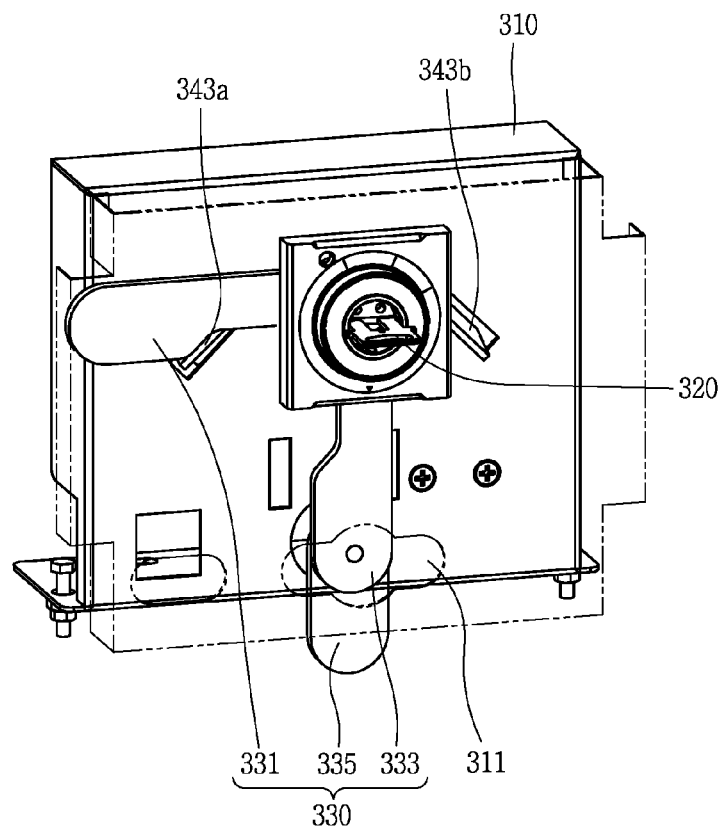
FIG. 8 is a perspective view illustrating the position-indicating apparatus in a state that the truck is located at an operation position in accordance with the present invention.
Figure 9:
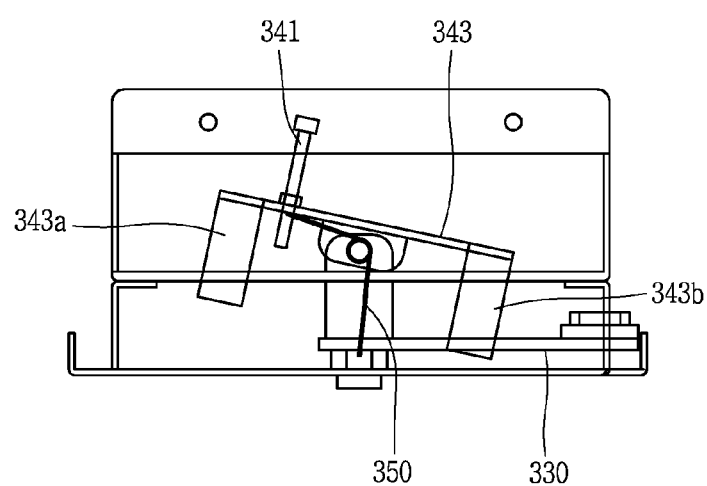
FIG. 9 is a projective view illustrating the position-indicating apparatus in a state that the truck is located at the operation position in accordance with the present invention.

Also, FIG. 6 is a perspective view illustrating the position-indicating apparatus in a state that the truck is located at the test position in accordance with the present invention, FIG. 7 is a projective view illustrating the position-indicating apparatus in a state that the truck is located at the test position in accordance with the present invention, FIG. 8 is a perspective view illustrating the position-indicating apparatus in a state that the truck is located at an operation position in accordance with the present invention, and FIG. 9 is a projective view illustrating the position-indicating apparatus in a state that the truck is located at the operation position in accordance with the present invention.

Figure 10:
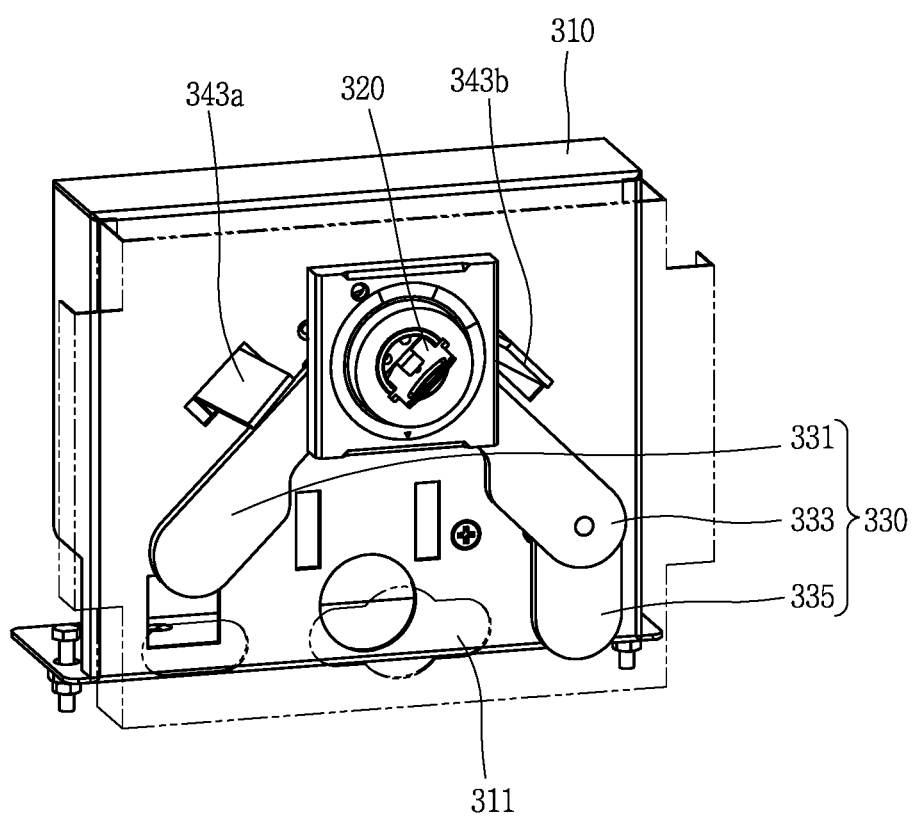
FIG. 10 is a perspective view illustrating the position-indicating apparatus in a state that a position-indicating unit is rotated by a predetermined distance while the truck is located at the test position.
Figure 11:
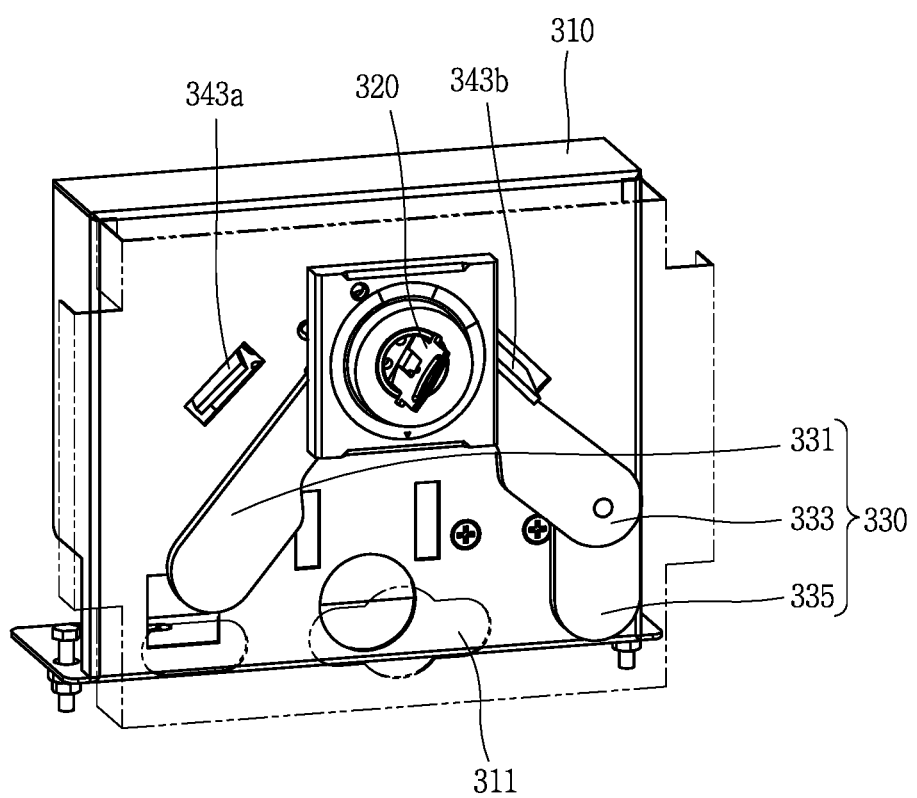
FIG. 11 is a perspective view illustrating the position-indicating apparatus in a state that the position-indicating unit is rotated by a predetermined distance while the truck is located at the operation position.

FIG. 10 is a perspective view illustrating the position-indicating apparatus in a state that a position-indicating unit is rotated by a predetermined distance while the truck is located at the test position, and FIG. 11 is a perspective view illustrating the position-indicating apparatus in a state that the position-indicating unit is rotated by a predetermined distance while the truck is located at the operation position.

As illustrated in FIGS. 2 to 4, in a high voltage transformer in accordance with the present invention, a transformer door 200 of a transformer chamber 100 may be fixed to a switchboard by hinges to be open and closed. A transformer 110 may be located in the transformer chamber 100 in a mounted state on a truck 500. The transformer 110 may move in a cradle 400 to a test position or an operation position, thereby being brought into contact with or separated from a terminal.

In this instance, a position-indicating apparatus, which indicates a position of the truck 500 with the transformer 110 mounted thereon to the exterior in a state that the transformer door 200 is open, may be provided at a girder 600 located at a front portion of the truck 500.

The position-indicating apparatus may be located adjacent to a circuit breaker chamber (not illustrated) with a circuit breaker (not illustrated) to externally indicate a position of the circuit breaker.

As illustrated in FIGS. 4 and 5, the position-indicating apparatus 300 may include a case 310 with a handle-inserting portion 311, a position-indicating unit 320, a rotation member 330, and a rotation-adjusting member 340.

The case 310 may define an appearance of the position-indicating apparatus 300, and accommodate therein various components. The handle-inserting portion 311, in which a manipulation handle (not illustrated) for moving the truck 500 to the test position or the operation position is inserted, may be formed at a lower portion of the case 310.

The position-indicating unit 320 which is provided at the case 310 may externally indicate the test position or the operation position of the truck 500 according to a user's manipulation, and simultaneously rotate the rotation member 330 to open or close the handle-inserting portion 311.

The rotation member 330 which is provided in the case 310 may be connected to the position-indicating unit 320. The rotation member 330 may rotate, in response to rotation of the position-indicating unit 320, to open or close the handle-inserting portion 311.

In this instance, the rotation member 330 may include a first wing plate 331, and a second wing plate 333 integrally extending from one side of the first wing plate 331 to form a predetermined angle with the first wing plate 331. The second wing plate 333 may further be provided with a second wing plate extending bar 335.

Accordingly, the rotation member 330 may rotate in response to the rotation of the position-indicating unit 320. In turn, the first wing plate 331 and the second wing plate 333 may open or close the handle-inserting portion 331, thereby restricting or allowing the adjustment of the truck 500 to the test position or operation position.

Besides, the first wing plate 331 and the second wing plate 333 may have widths which increase from one side where they are connected to each other to another side.

The rotation-adjusting member 340 may be located between the rotation member 330 and the truck 500. When the truck 500 moves to the test position or operation position, the rotation-adjusting member 340 may rotate toward the rotation member 330 or the truck 500 so as to protrude toward the rotation member 330. The rotation-adjusting member 340 may accordingly restrict the rotation of the rotation member 330 to the test position or operation position, such that the test position or operation position of the truck 500 can be equal to (or match) the test position or operation position which is indicated through the position-indicating unit 320 connected to the rotation member 330.

In more detail, the rotation-adjusting member 340 may include an adhesion pin 341, and a rotation plate 343 connected with the pushing pin 341. A truck cover 510 may be provided at a front surface of the truck 500.

The adhesion pin 341 may be located in a manner of protruding toward the truck 500. Accordingly, the adhesion pin 341 may be closely adhered to or separated from the truck cover 510, in response to the movement of the truck 500 to the test position or operation position.

The rotation plate 343 may be coupled with the adhesion pin 341. The rotation plate 343 may include a first rotation-adjusting plate 343a provided at one side thereof and protruding toward the rotation member 330 when the truck 500 moves to the test position, and a second rotation-adjusting plate 343b provided at another side thereof and protruding toward the rotation member 330 when the truck 500 moves to the operation position. In this instance, the first rotation-adjusting plate 343a and the second rotation-adjusting plate 343b may be inwardly inclined by predetermined angles.

Therefore, as illustrated in FIGS. 6 and 7, when the truck 500 moves to the test position, the truck cover 510 may push the adhesion pin 341. The first rotation-adjusting plate 343a may accordingly protrude toward the rotation member 330 so as to be located on the same line with the rotating direction of the rotation member 330.

In this instance, as illustrated in FIG. 10, when the rotation member 330 rotates to the operation position, in response to the rotation of the position-indicating unit 320, the first wing plate 331 may be brought into contact with the first rotation-adjusting plate 343a to restrict the rotation of the rotation member 330 to the operation position and simultaneously restrict the rotation of the position-indicating unit 320 connected to the rotation member 330. This may allow the position of the truck 500 to be equal to the position of the truck 500 externally indicated through the position-indicating unit 320, without an error.

As illustrated in FIGS. 8 and 9, when the truck 500 moves to the operation position, the close adhesion between the truck cover 510 and the adhesion pin 341 may be released and simultaneously the rotation plate 343 may be rotated by elastic force of an elastic member 350, such as a torsion spring or the like, to protrude toward the rotation member 330, such that the second rotation-adjusting plate 343b can be located on the same line with the rotating direction of the rotation member 330.

In this instance, when the rotation member 330 rotates from the operation position to the test position, the second wing plate 333 may be brought into contact with the second rotation-adjusting plate 343b to restrict the rotation of the rotation member 330 to the operation position and simultaneously the rotation of the position-indicating unit 320 connected to the rotation member 330. Accordingly, the position of the truck 500 and the position of the truck externally indicated through the position-indicating unit 320 may be equal to each other.

With the configuration of the present invention, when the truck 500 on which the circuit breaker or the transformer 110 is mounted is located at the test position, the rotation-adjusting member 340 may prevent the position-indicating unit 320 from rotating to the operation position. Also, when the truck 500 is located at the operation position, the rotation-adjusting member 340 may prevent the position-indicating unit 320 from rotating to the test position. This may allow for correctly checking the position of the circuit breaker or the transformer 110 at the outside through the position-indicating unit 320.

Also, with allowing for the correct check of the position of the circuit breaker or the transformer 110 at the outside, an electric shock of an operator or the like, which is caused due to the operator opening a circuit breaker door (not illustrated) or the transformer door 200 while the circuit breaker or the transformer 110 is located at the operation position, can be prevented in advance.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A position-indicating apparatus of a switchboard for indicating a position of a transformer or a circuit breaker, the position-indicating apparatus comprising:
   a case;
   a position-indicating unit provided in the case and indicating a test position or an operation position of a truck on which the circuit breaker or the transformer is mounted;
   a rotation member provided in the case and connected to the position-indicating unit, the rotation member rotatable in response to rotation of the position-indicating unit; and
   a rotation-adjusting member located between the rotation member and the truck, the rotation-adjusting member rotatable toward the rotation member or the truck in response to movement of the truck and configured to restrict rotation of the rotation member,
   wherein the rotation-adjusting member prevents rotation of the rotation member to the operation position when the truck is located at the test position,
   wherein the rotation-adjusting member prevents rotation of the rotation member to the test position when the truck is located at the operation position,
   wherein the rotation-adjusting member comprises:
      an adhesion pin that protrudes toward the truck; and
      a rotation plate coupled to the adhesion pin, the rotation plate including a first rotation-adjusting plate provided at a first side of the rotation plate and protruding toward the rotation member and a second rotation-adjusting plate provided at a second side of the rotation plate and protruding toward the rotation member,
   wherein a cover is provided at a front surface of the truck,
   wherein the cover is configured to push the adhesion pin to cause the first rotation-adjusting plate to protrude toward the rotation member such that rotation of the rotation member toward the operation position is restricted by the first rotation-adjusting plate when the truck moves to the test position, and
   wherein adhesion between the cover and the adhesion pin is released and the rotation plate simultaneously rotates to cause the second rotation-adjusting plate to protrude toward the rotation member such that rotation of the rotation member toward the test position is restricted by the second rotation-adjusting plate when the truck moves to the operation position.

2. The apparatus of claim 1, wherein the rotation member comprises:
   a first wing plate; and
   a second wing plate extending from one side of the first wing plate to form a predetermined angle with the first wing plate,
   wherein the first rotation-adjusting plate contacts the first wing plate to restrict rotation of the rotation member toward the test position when the rotation member rotates to the operation position in response to rotation of the position-indicating unit when the truck is located at the test position, and
   wherein the second rotation-adjusting plate contacts the second wing plate to restrict rotation of the rotation member toward the operation position when the rotation member rotates to the test position in response to rotation of the position-indicating unit when the truck is located at the operation position.

3. The apparatus of claim 2, wherein the first rotation-adjusting plate and the second rotation-adjusting plate are inwardly inclined by predetermined angles.

* * * * *